(12) United States Patent
Cunha et al.

(10) Patent No.: US 9,194,585 B2
(45) Date of Patent: Nov. 24, 2015

(54) COOLING FOR COMBUSTOR LINERS WITH ACCELERATING CHANNELS

(71) Applicant: United Technologies Corporation, Hartford, CT (US)

(72) Inventors: Frank J. Cunha, Avon, CT (US); Timothy S. Snyder, Glastonbury, CT (US); Nurhak Erbas-Sen, Manchester, CT (US); Alexander W. Williams, Windsor Locks, CT (US); Nicholas Mule, Thousand Oaks, CA (US); James P. Bangerter, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 597 days.

(21) Appl. No.: 13/645,016

(22) Filed: Oct. 4, 2012

(65) Prior Publication Data

US 2014/0096528 A1   Apr. 10, 2014

(51) Int. Cl.
  *F23R 3/00* (2006.01)
  *F23R 3/06* (2006.01)
  *F23R 3/16* (2006.01)
  *F02C 7/18* (2006.01)

(52) U.S. Cl.
  CPC ... *F23R 3/06* (2013.01); *F02C 7/18* (2013.01); *F23R 3/002* (2013.01); *F23R 3/005* (2013.01); *F23R 3/16* (2013.01); *F23R 2900/03041* (2013.01); *F23R 2900/03042* (2013.01); *F23R 2900/03043* (2013.01); *F23R 2900/03044* (2013.01); *F23R 2900/03045* (2013.01); *Y02T 50/675* (2013.01)

(58) Field of Classification Search
  CPC ............ F23R 3/002; F23R 3/005; F23R 3/06; F23R 3/16; F23R 2900/03041; F23R 2900/03042; F23R 2900/03043; F23R 2900/03044; F23R 2900/03045; F05D 2260/20; F05D 2260/201; F05D 2260/202; F05D 2260/203; F05D 2260/204; F05D 2260/213; F05D 2260/221; F05D 2260/2212; F05D 2260/2214; F05D 2260/22141; F05B 2260/20; F05B 2260/201; F05B 2260/202; F05B 2260/203; F05B 2260/221; F05B 2260/222; F05B 2260/224; F05B 2260/2241
  See application file for complete search history.

(56) References Cited

U.S. PATENT DOCUMENTS 3,420,058 A   1/1969   Howald et al.
4,292,810 A   10/1981  Glenn
(Continued)

FOREIGN PATENT DOCUMENTS

DE   1952436 A1   6/1971

OTHER PUBLICATIONS

International Search Report and Written Opinion for related International Application No. PCT/US13/57059; report dated May 27, 2014.

*Primary Examiner* — Gerald L Sung
*Assistant Examiner* — Scott Walthour
(74) *Attorney, Agent, or Firm* — Miller, Matthias & Hull LLP

(57) ABSTRACT

A combustor liner which reduces cooling flow to a combustion chamber and augments pressure drop split between impingement holes and effusion holes is disclosed. The combustor liner may further include accelerating channels, trip strips, pedestals, and cone-shaped effusion holes to provide further cooling of the liner. The combustor liner may reduce NOx production and the temperature of the combustion chamber of a gas turbine engine or the like.

20 Claims, 5 Drawing Sheets

(56) References Cited

U.S. PATENT DOCUMENTS

| | | | |
|---|---|---|---|
| 4,392,355 A | | 7/1983 | Verdouw |
| 4,944,152 A | | 7/1990 | Shekleton |
| 6,122,917 A | * | 9/2000 | Senior .............................. 60/752 |
| 6,213,714 B1 | | 4/2001 | Rhodes |
| 6,282,905 B1 | * | 9/2001 | Sato et al. ....................... 60/752 |
| 7,695,247 B1 | | 4/2010 | Liang |
| 2007/0062198 A1 | * | 3/2007 | Huth et al. ....................... 60/752 |
| 2008/0271457 A1 | | 11/2008 | McMaters |

\* cited by examiner

COOLING FOR COMBUSTOR LINERS WITH ACCELERATING CHANNELS

FIELD OF THE DISCLOSURE

The present disclosure generally relates to gas turbine engines and, more specifically, to cooling of combustors of gas turbine engines.

BACKGROUND OF THE DISCLOSURE

A gas turbine engine, typically used as a source of propulsion in aircraft, operates by drawing in ambient air, mixing and combusting that air with a fuel, and then directing the exhaust from the combustion process out of the engine. A compressor, with a plurality of blades, rotates to draw in and compress the ambient air. A portion of the compressed air is used to cool a combustor, while the rest is directed into the combustor, mixed with a fuel, and ignited.

Typically an igniter generates an electrical spark to ignite the air-fuel mixture. The products of the combustion, NOx and CO, and the remains of the air-fuel mixture then travel out of the combustion chamber as exhaust and through a turbine. The turbine, having a plurality of blades extending from a central shaft, is forced to rotate as the exhaust passes through the turbine blades. The turbine and the compressor are connected by the same rotating shaft running through the center of the engine. Thus, as the turbine rotates from the exhaust, the compressor rotates to bring in and compress new air. Once started, it can therefore be seen that this process is self-sustaining.

Combustors for gas turbine engines typically have an outer combustor shell and an outer liner, which may be made of a plurality of panels, disposed radially inside the outer combustor shell. Additionally, annular combustors have an inner combustor shell and an inner liner radially outside the inner combustor shell. The inner and outer liners are separated by and define a combustion chamber. Flow cavities are typically provided between each pair of shells and liners. Cooling air is forced through these flow cavities and into the combustion chamber, creating a cooling film on hot surfaces of the liners.

Prior art combustion chamber configurations used geometrical profiles that were not convergent in a primary rich zone. Over time, however, such configurations evolved to have a convergent section at the primary rich zone. One of the design intents of such prior art designs was to increase the combustion flow velocity to reduce corresponding combustor residence time. Since time plays a direct part in NOx formation, convergent combustion chamber designs provided an added benefit for NOx. However, aggressive tapering of the convergent combustion chamber section may cause entrainment of cooling flow in the outer recirculation zone. This, in turn, may effect local chemistry as the fuel rich zone trends towards stoichiometric conditions. In this case, flame temperatures increase along with NOx formation.

In light of the foregoing, it can be seen that the gas turbine engine industry continues to strive for designs with reduced NOx emissions, while at the same time increasing engine cooling to thus enhance the serviceable life of the engine.

SUMMARY OF THE DISCLOSURE

In accordance with one aspect of the disclosure, a combustor is disclosed which may include a combustor shell having a plurality of impingement holes, a combustor liner disposed inside the combustor shell and having a inner hot surface and an outer cold surface, the combustor liner and the combustor shell defining a flow cavity therebetween, the combustor liner further having a plurality of effusion holes offset from the impingement holes, and a tapered panel disposed in the flow cavity and defining an accelerating channel such that cooling air is accelerated between the tapered panel and the cold surface from the plurality of impingement holes to the plurality of effusion holes.

In a refinement, the number of effusion holes and the number of impingement holes may be equal.

In another refinement, a plurality of pedestals may be disposed on the cold surface of the combustor liner below the plurality of impingement holes.

In another refinement, at least one trip strip may be disposed on the cold surface of the combustor liner.

In another refinement, a plurality of scallops may be disposed in the tapered panel such that cooling air is turned toward the plurality of effusion holes.

In yet another refinement, the effusion holes may be frusto-conically shaped with a broad end at the hot surface and a narrow end at the cold surface.

In yet another refinement, the accelerating channel may narrow from the impingement holes to the effusion holes by a ratio of three to one.

In yet another refinement, the pedestals may be diamond shaped.

In yet another refinement, a calming region may be disposed between each of a plurality of cooling paths, each cooling path may include at least an accelerating channel.

In accordance with another aspect of the disclosure, a gas turbine engine is disclosed which may include a compressor, a combustor downstream of the compressor, and a turbine downstream of the combustor and connected to the compressor by a rotating shaft. The combustor may include a combustor shell having a plurality of impingement holes and a combustor liner disposed inside the combustor shell. The combustor liner may have an inner hot surface and an outer cold surface. The combustor liner and combustor shell may define a flow cavity therebetween and the combustor liner may also have a plurality of effusion holes offset from the plurality of impingement holes. The combustor may further include a tapered panel disposed in the flow cavity and defining an accelerating channel such that cooling air is accelerated between the tapered panel and the cold surface from the plurality of impingement holes to the plurality of effusion holes.

In a refinement, a plurality of pedestals may be disposed on the cold surface of the combustor liner and under the plurality of impingement holes.

In another refinement, a plurality of scallops may be disposed in the tapered panel such that cooling air is turned toward the plurality of effusion holes.

In accordance with yet another embodiment of the disclosure, a method of cooling a combustor is disclosed. The method may include passing cooling air through a plurality of impingement holes in a combustor shell into a flow cavity provided between an inner surface of the combustor shell and a cold surface of the combustor liner, accelerating the cooling air through an acceleration channel defined by a tapered panel disposed in the flow cavity, passing the cooling air through a plurality of effusion holes in the combustor liner, and creating a cooling film on a hot surface of the combustor liner with the cooling air leaving the plurality of effusion holes.

In a refinement, the method may further include impinging the cooling air on a plurality of pedestals disposed on the cold surface.

In another refinement, the method may further include increasing turbulence in the flow cavity by passing the cooling air over at least one trip strip disposed on the cold surface of the combustor liner at an angle to a flow of cooling air.

In another refinement, the method may further include directing the cooling air towards the plurality of effusion holes by a plurality of scallops disposed in the tapered panel.

In another refinement, the method may further include minimizing blow off of the cooling film by passing the cooling air through cone shaped effusion holes, the broad end being on the hot surface and the narrow end being on the cold surface.

In another refinement, the method may further include accelerating the cooling air to a subsonic Mach of about 0.5 or higher by the accelerating channel.

In yet another refinement, the method may further include preventing cross flow degradation by incorporating a calming region between each cooling path, each cooling path may include at least an accelerating channel.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
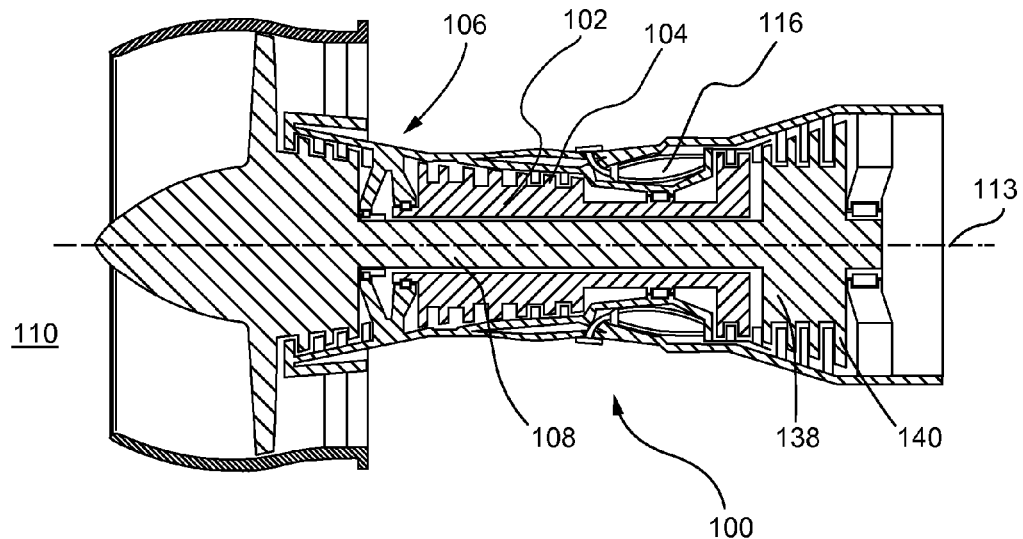
FIG. 1 is a sectional view of a gas turbine engine built in accordance with the present disclosure.
Figure 2:
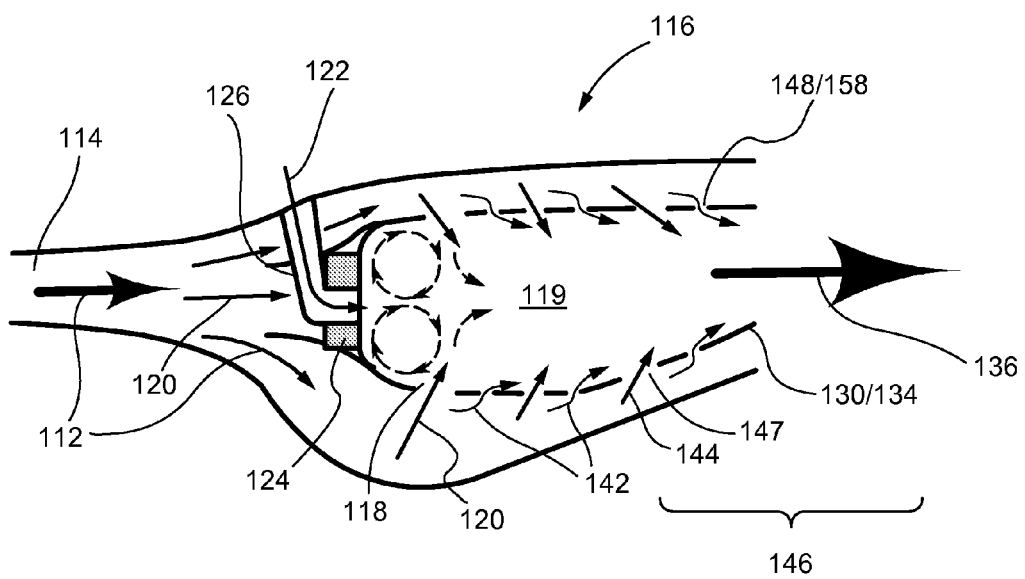
FIG. 2 is a schematic side view of the air flow of a combustor constructed in accordance with the teachings of this disclosure.

Referring now to the drawings, and with specific reference to FIG. 1, a gas turbine engine, generally referred to by numeral 100, is disclosed. The gas turbine engine 100 may have a compressor 102 with a plurality of blades 104 positioned at a forward end 106 of the engine 100. The compressor 102 may further be connected to a rotating shaft 108. When the compressor 102 rotates, it draws ambient air 110 into the engine 100, and compresses same into compressed air 112. The compressed air 112 may be forced through a diffuser 114, as shown in FIG. 2, to a combustor 116. At the combustor 116, the compressed air 112 may be split to be used in multiple ways.

Figure 3:
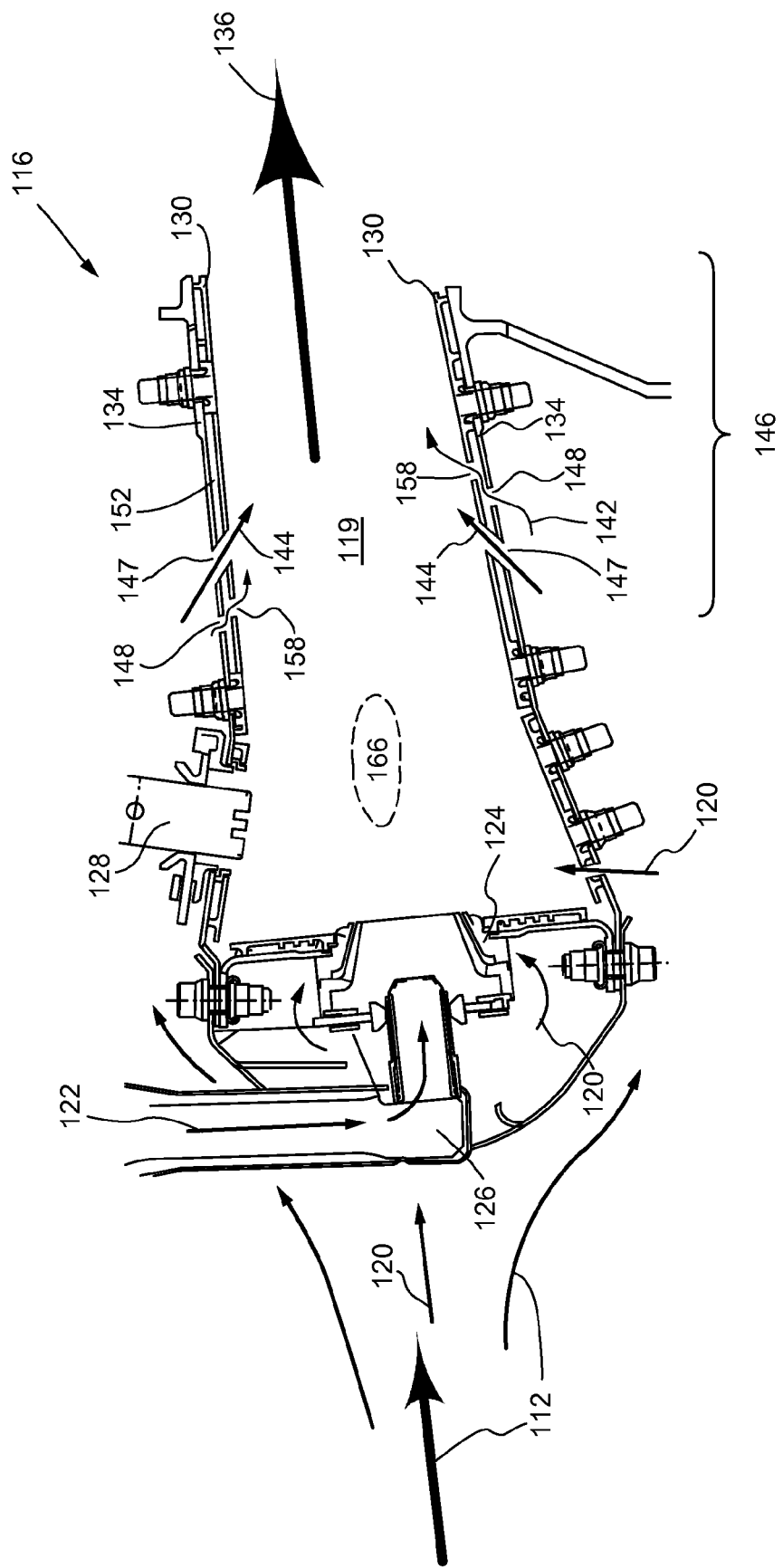
FIG. 3 is a sectional view of a combustor built in accordance with the present disclosure.

Referring now to FIG. 2 and FIG. 3, at the combustor 116 some of the compressed air 112 may pass through a plurality of air admittance holes 118 into a combustion chamber 119 as combustion air 120. The combustion air 120 may be mixed with a fuel 122 by a swirler 124. The fuel 122 may enter the combustion chamber 119 by a fuel injector 126. The air-fuel mixture may then be ignited by an igniter 128 disposed through a combustor liner 130 and a combustor shell 134. As will be noted from FIG. 3, the combustor liner 130 is provided inside the combustor shell 134 and thereby defines the combustion chamber 119.

The combustion products and un-burnt fuel 122 may then be ejected from the combustion chamber 119 as exhaust 136. The exhaust 136 may pass through a turbine 138, as seen in FIG. 1, having a plurality of blades 140 as the exhaust 136 exits the engine 100. The turbine 138 may also be connected to the rotating shaft 108 such that when the turbine 138 is rotated by the exhaust 136, the rotating shaft 108, and thus the compressor 102, may be rotated about central axis 113. The process may thereby draw in more ambient air 110 as the exhaust 136 exits and may be self-sustaining once it has begun.

The compressed air 112 not used as combustion air 120 may be used as cooling air 142 or dilution air 144. The dilution air 144 may enter the combustion chamber 119 at a back end 146 thereof through air admittance holes 147. The dilution air 144 reduces the concentration of the un-burnt fuel 122 and the products of the combustion process in the exhaust 136, as well as the temperature of the exhaust 136 before the exhaust 136 reaches the turbine 138. While only one or two air admittance holes 144 may be depicted in the drawings, it is to be understood that this is only for illustration and that a greater or lesser number may be employed.

Figure 4:
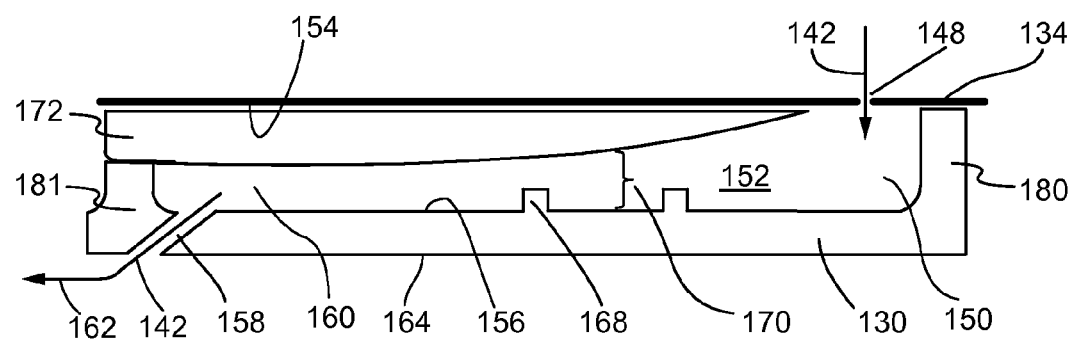
FIG. 4 is a sectional view of a combustor liner built in accordance with the present disclosure depicting trip strips and an accelerating channel.

The cooling air 142, on the other hand, may be forced through a plurality of impingement holes 148 in the combustor shell 134 into a first end 150 of a flow cavity 152 as shown in FIG. 4. The flow cavity 152 is the space disposed between an inner surface 154 of the combustor shell 134 and a cold surface 156 of the combustor liner 130. The referenced combustor shell 134 and combustor liner 130 may be either an outer or inner shell and liner combination. A plurality of effusion holes 158 may be disposed in the liner 130 at a second end 160 of the flow cavity 152, such that the cooling air 142 must travel the length of the flow cavity 152 before the cooling air 142 may exit through the effusion holes 158. The cooling air 142 may cool the combustor liner 130 by convection as it travels through the flow cavity 152.

As the cooling air 142 exits the effusion holes 158 the cooling air 142 may spread out to form a cooling film 162 as shown in FIG. 4. The cooling film 162 may reduce the temperature of a hot surface 164 of the combustor liner 130. The cooling film 162 may then exit the combustion chamber 119 as exhaust 136.

In prior art designs, cooling films may have reached a fuel-rich zone 166 in the combustion chamber 119 and caused the combustion process to trend towards stoichiometric conditions. This is undesirable, though, since as the combustion process reaches stoichiometric conditions, the temperature inside the combustion chamber 119 rises and causes NOx production to rise. Here, however, the present disclosure greatly improves on the prior art. More specifically, the inventors have found that to reduce the effect of the cooling film 162 on the combustion process the cooling flow needs to be reduced. This may be achieved by reducing the number of effusion holes 158 in the combustor liner 130, but, this reduction in effusion holes 158 may in turn reduce the cooling capability of the combustor 116.

To balance these two objectives, the inventors have found that to increase the cooling capability of a combustor 116 while at the same time decreasing the cooling flow through the effusion holes 158, a pressure drop between the impingement holes and the effusion holes may be adjusted. For example, by reducing the number of effusion holes 158, the impingement to effusion pressure drop split may become 50% to 50%, rather than the prior art pressure drop split of 80% to 20%. At a 50:50 pressure drop split, the number of impingement holes 148 may exactly match the number of effusion holes 158, but this equal ratio of holes 148 to 158 is only one example and the present disclosure should not be restricted to only this embodiment as any desired ratio of holes 148 to 158 is possible.

Figure 5:
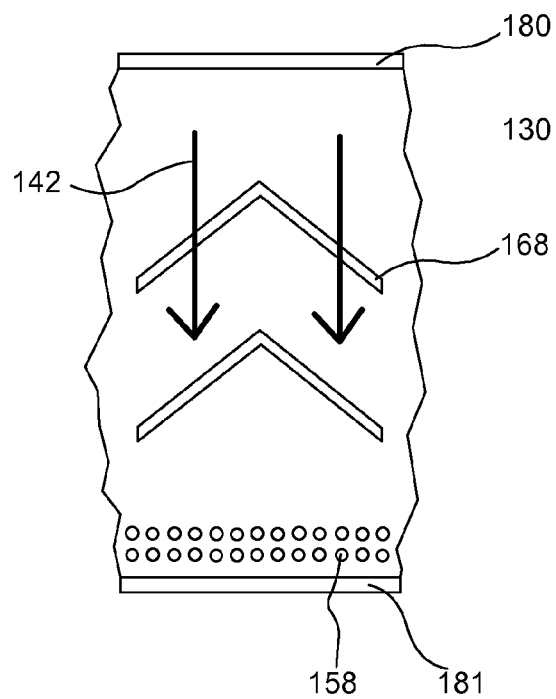
FIG. 5 is a top view of a combustor liner built in accordance with the present disclosure depicting chevron shaped trip strips.

In addition, as shown in FIG. 5, at least one trip strip 168 may be disposed on the cold surface 156 and be oriented in a chevron pattern. The trip strip 168 may increase turbulence in the flow cavity 152 which may force the cooling air 142 to interact with the cold surface 156 more significantly. The increased turbulence in the cooling air 142 may increase the cooling capabilities of the combustor 116.

The inventors have also found that the increased pressure drop available also allows for new cooling features in the flow cavity 152 such as an accelerating channel 170, as shown in FIG. 4. The accelerating channel 170 may be formed in the flow cavity 152 by a tapered panel 172 that may be wider at the second end 160 of the flow cavity 152 than at the first end 150. The tapered panel 172 may be disposed between the inner surface 154 and the cold surface 156 to create the channel 170 between the impingement holes 148 and the effusion holes 158 that narrows as the cooling air 142 approaches the effusion holes 158. This accelerating channel 170 may increase the speed of the cooling air 142 as the cooling air 142 passes through the channel 170.

In one embodiment, the accelerating channel 170 may narrow in cross-sectional area from the impingement holes 148 to the effusion holes 158 by a ratio of three to one, although other ratios are possible. This exemplary ratio may force the speed of the cooling air 142 to increase to a subsonic Mach of about 0.5 or higher. The speed of the cooling air 142 may also be increased beyond 0.5 Mach up to sonic speed, or to any desired speed by further modifying the accelerating channel 170.

Figure 6:
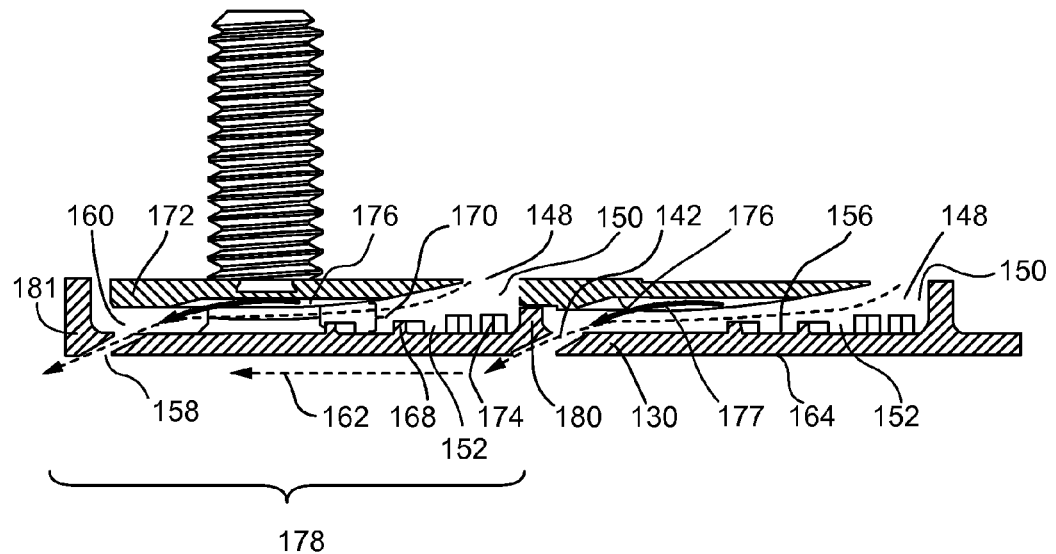
FIG. 6 is a sectional view of a combustor liner built in accordance with another embodiment of the present disclosure depicting pedestals and scallops.
Figure 8:
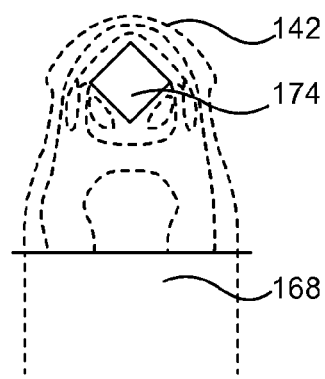
FIG. 8 is a top view of a diamond shaped pedestal built in accordance with an embodiment of the present disclosure.

Referring now to FIG. 6, it will be seen that the combustor liner 130 may also have a plurality of pedestals 174 or other protuberances extending therefrom. The pedestals 174 may be disposed under the impingement holes 148 on the cold surface 156. The pedestals 174 may compensate for and overcome the heat transfer debit associated with the loss of pressure potential relative to the prior art 80:20 pressure split designs. To accomplish this, the pedestals 174 may increase the surface area of the cold surface 156, thereby allowing for better heat transfer between the combustor liner 130 and the cooling air 142. In one embodiment, the pedestals 174 have a diamond shaped cross-section, such as in FIG. 8, which may increase the breakup of the cooling air 142 as the cooling air 142 moves over the pedestals 174 towards the trip strips 168. Other shapes increasing the surface area of the cold surface 156 are certainly possible.

Figure 7:
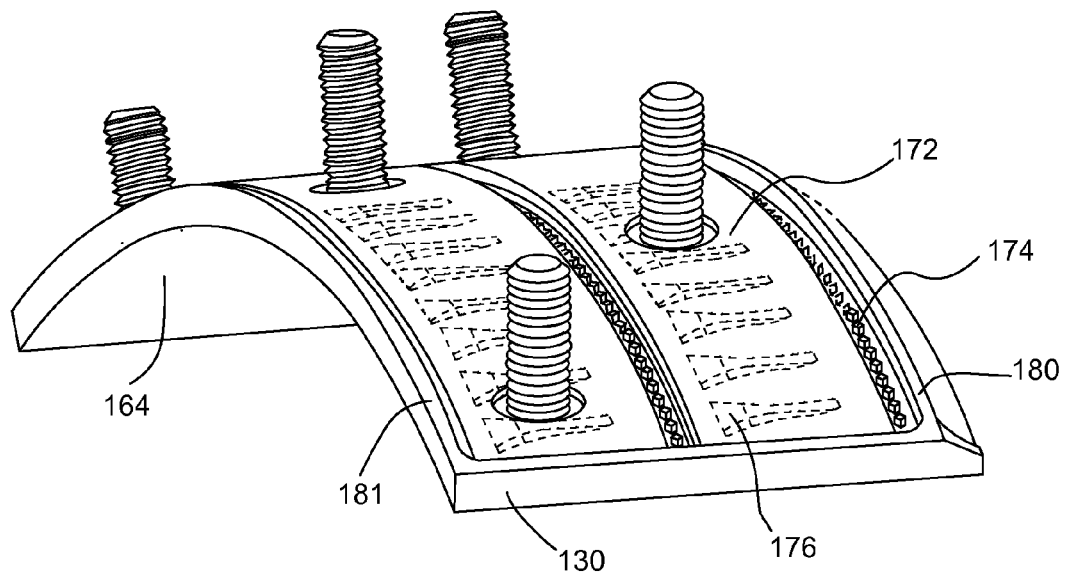
FIG. 7 is a perspective view of a combustor liner built in accordance with the present disclosure depicting tapered panels.

A further cooling feature shown in FIGS. 6 and 7 may be a plurality of scallops 176 disposed on the tapered panels 172. The scallops 176 may be curved recesses provided in the tapered panels 172 and be shaped such that cooling air 142 moving through the accelerating channel 170 is directed towards the plurality of effusion holes 158 as shown by arrow 177.

While the foregoing features can be combined in various ways, one exemplary cooling path 178 according to the present disclosure may include all such features including the impingement holes 148, the effusion holes 158, the trip strips 168, the accelerating channels 170 formed by the tapered panel 172, the pedestals 174, and the scallops 176. The cooling path 178 may be bound by a first liner wall 180 at the first end 150 and a second liner wall 181 at the second end 160 of the flow cavity 152. However, as shown in FIG. 9, there may be a plurality of cooling paths 178 next to each other with no separating liner walls.

Figure 9:
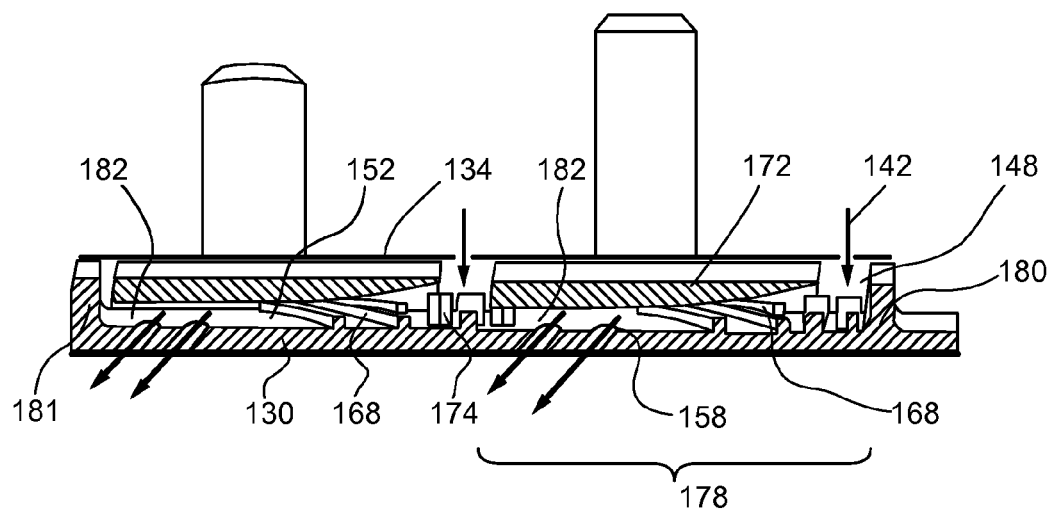
FIG. 9 is a sectional view of a combustor liner built in accordance with another embodiment of the present disclosure depicting a calming region separating cooling patterns.

Further, as shown in FIG. 9, there may be a calming region 182 between each cooling path 178. The tapered panel 172 may not be tapered in the calming region 182. This may facilitate a slowing of the cooling air 142. Friction between the cooling air 142 and the cold surface 156 as well as the tapered panel 172 may facilitate the slowing of the cooling air 142. The slower moving cooling air 142 may not cause cross flow interference with other cooling patterns 178.

Figure 10:
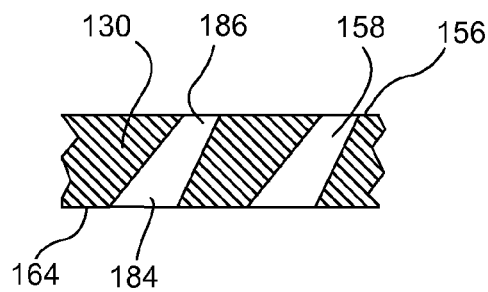
FIG. 10 is a sectional view of a plurality of frusto-conical shaped effusion holes constructed in accordance with the present disclosure.

FIG. 10 depicts a plurality of effusion holes 158 that have been machined or fabricated into a conical or frusto-conical shape in accordance with one embodiment of the disclosure. The effusion holes 158 may be so formed by laser-drilling or the like. The broad end 184 of the effusion hole 158 may be at the hot surface 164, and the narrow end 186 of the effusion hole 158 may be at the cold surface 156. The conical or frusto-conical shape of the effusion holes 158 may minimize blow-off of the cooling film 162 on the hot surface 164. The cooling air 142 exiting the conical shaped effusion holes 158 may therefore spread out to cover more of the hot surface 164, thereby protecting more of the combustor liner 130 from the hot temperatures of the combustion chamber 119.

Industrial Applicability

From the foregoing, it can be seen that the technology disclosed herein has industrial applicability in a variety of settings such as, but not limited to cooling combustion chambers of gas turbine engines, as well as reducing emission concentrations in the exhaust of gas turbine engines. The gas turbine engine may be used in conjunction with an aircraft for generating thrust, or for land-based applications for generating power. Using the teachings of the present disclosure, a combustor liner may be constructed to decrease cooling flow into the combustion chamber while maintaining adequate cooling of the combustor liner. This improvement over the prior art may prevent cooling air from interacting with the fuel-rich zone of the combustion chamber during operation, and thus may reduce the overall temperature of the combustion chamber as well as reducing NOx production. This design may further dilute and cool the exhaust of the combustion chamber more than the prior art.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all embodiments falling within the scope of the claims.

What is claimed is:

1. A method of cooling a combustor, comprising:
passing cooling air through a plurality of impingement holes in a combustor shell into a flow cavity defined between an inner surface of the combustor shell and an outer cold surface of a combustor liner, the combustor liner disposed inside the combustor shell; accelerating the cooling air from the plurality of impingement holes through an acceleration channel defined between the outer cold surface of the combustor liner and a tapered panel which is disposed in the flow cavity and on the combustor shell; passing the cooling air through a plurality of effusion holes in the combustor liner, the plurality of effusion holes being offset from the plurality of impingement holes; and creating a cooling film on an inner hot surface of the combustor liner with the cooling air leaving the plurality of effusion holes.

2. The method of claim 1, further comprising impinging the cooling air on a plurality of
pedestals disposed on the outer cold surface of the combustor liner.

3. The method of claim 1, further comprising increasing turbulence in the flow cavity by passing
the cooling air over at least one trip strip disposed on the outer cold surface of the
combustor liner at an angle to a flow of cooling air.

4. The method of claim 1, further comprising directing the cooling air towards the plurality of effusion holes past a plurality of scallops disposed in the tapered panel.

5. The method of claim 1, wherein said plurality of effusion holes are frusto-conically shaped, thereby minimizing blow off of the cooling film, a broad end of each of said plurality of effusion holes being on the inner hot surface of the combustor liner and a narrow end of each of said plurality of effusion holes being on the outer cold surface of the combustor liner.

6. The method of claim 1, further comprising accelerating the cooling air to a subsonic Mach number of about 0.5 or higher in the accelerating channel.

7. The method of claim 1, further comprising preventing cross flow degradation by
incorporating a calming region between each of a plurality of cooling paths, each cooling
path including at least a respective accelerating channel.

8. A combustor, comprising:
a combustor shell having a plurality of impingement holes;
a combustor liner disposed inside the combustor shell and having an inner hot surface and an outer cold surface, the combustor liner and combustor shell defining a flow cavity therebetween, the combustor liner having a plurality of effusion holes offset from the plurality of impingement holes; and
a tapered panel disposed in the flow cavity and on the combustor shell and defining an accelerating channel such that cooling air is accelerated between the tapered panel and the outer cold surface of the combustor liner from the plurality of impingement holes to the plurality of effusion holes.

9. The combustor of claim 8, wherein the number of effusion holes and the number of impingement holes are equal.

10. The combustor of claim 8, wherein a plurality of pedestals are disposed on the outer cold
surface of the combustor liner below the plurality of impingement holes.

11. The combustor of claim 8, wherein at least one trip strip is disposed on the outer cold surface
of the combustor liner.

12. The combustor of claim 8, wherein a plurality of scallops are disposed in the tapered panel such that cooling air is turned toward the plurality of effusion holes.

13. The combustor of claim 8, wherein the plurality of effusion holes are frusto-conically shaped
with a broad end at the hot surface and a narrow end at the outer cold surface.

14. The combustor of claim 8, wherein the accelerating channel narrows from the plurality of
impingement holes to the plurality of effusion holes by a ratio of three to one.

15. The combustor of claim 10, wherein the plurality of pedestals are diamond shaped.

16. The combustor of claim 11, wherein each trip strip is chevron shaped.

17. The combustor of claim 8, wherein a calming region is disposed between each of a plurality of
cooling paths, each cooling path including at least a respective accelerating
channel.

18. A gas turbine engine, comprising:
a compressor;
a combustor downstream of the compressor and including a combustor shell having a plurality of impingement holes, a combustor liner disposed inside the combustor shell and having an inner hot surface and an outer cold surface, the combustor liner and combustor shell defining a flow cavity therebetween, the combustor liner having a plurality of effusion holes offset from the plurality of impingement holes, and
a tapered panel disposed in the flow cavity and on the combustor shell and defining an accelerating channel such that cooling air is accelerated between the tapered panel and the outer cold surface of the combustor liner from the plurality of impingement holes to the plurality of effusion holes; and a turbine downstream of the combustor and connected to the compressor by a rotating shaft.

19. The gas turbine engine of claim 18, wherein a plurality of pedestals are disposed on the outer
cold surface of the combustor liner and under the plurality of impingement holes.

20. The gas turbine engine of claim 18, wherein a plurality of scallops are disposed in the tapered panel such that cooling air is turned toward the plurality of effusion holes.

* * * * *